United States Patent
Bares et al.

(10) Patent No.: US 7,845,471 B2
(45) Date of Patent: Dec. 7, 2010

(54) EXTERNAL AXLE COOLING SYSTEM

(75) Inventors: Michael Sylvester Bares, Fargo, ND (US); Troy David Bateman, Channahon, IL (US); Jarrod Lemire, Cedar Falls, IA (US); Regis Bellanger, Sery Magneval (FR); Jürgen Weber, Dresden (DE)

(73) Assignee: CNH America LLC, New Holland, PA (US)

( * ) Notice: Subject to any disclaimer, the term of this patent is extended or adjusted under 35 U.S.C. 154(b) by 315 days.

(21) Appl. No.: 11/843,232

(22) Filed: Aug. 22, 2007

(65) Prior Publication Data

US 2009/0050412 A1    Feb. 26, 2009

(51) Int. Cl.
*F16H 57/04*    (2010.01)
*F01M 5/00*    (2006.01)

(52) U.S. Cl. ................ 184/6.22; 184/27.2; 184/29; 74/606 A

(58) Field of Classification Search .......... 184/104.1, 184/22, 26, 27.1, 27.2, 29; 165/41, 42; 188/264 P, 188/264 R; 74/606 A, 606 R; 301/6.3
See application file for complete search history.

(56) References Cited

U.S. PATENT DOCUMENTS

| | | | |
|---|---|---|---|
| 1,992,568 A | 2/1935 | Connor | |
| 2,698,773 A | 1/1955 | Kaczor | |
| 3,259,216 A | 7/1966 | Klaus et al. | |
| 3,949,844 A | 4/1976 | Larson et al. | |
| 4,083,469 A | 4/1978 | Schexnayder | |
| 4,393,922 A | 7/1983 | Bahrle et al. | |
| 4,633,938 A | 1/1987 | Schunck et al. | |
| 5,931,218 A | 8/1999 | Carlson et al. | |
| 5,975,257 A | 11/1999 | Roach | |
| 6,092,628 A * | 7/2000 | Hinton et al. | 184/6.22 |
| 6,186,285 B1 | 2/2001 | Parsons | |
| 6,432,018 B1 | 8/2002 | Morse et al. | |
| 6,474,405 B1 | 11/2002 | Bell et al. | |
| 6,871,726 B2 | 3/2005 | Coyle et al. | |
| 6,899,074 B1 * | 5/2005 | Carlsson | 123/196 AB |
| 6,907,958 B2 | 6/2005 | Coyle et al. | |
| 7,513,343 B2 * | 4/2009 | Catalano | 188/264 P |
| 2001/0023669 A1 * | 9/2001 | Buysse | 123/41.55 |
| 2003/0188937 A1 | 10/2003 | Schneider et al. | |
| 2004/0149518 A1 | 8/2004 | Coyle et al. | |
| 2004/0238283 A1 * | 12/2004 | Coyle et al. | 184/6.22 |
| 2005/0164830 A1 * | 7/2005 | Schmidt et al. | 477/176 |
| 2006/0124275 A1 * | 6/2006 | Gosse et al. | 165/42 |
| 2007/0151222 A1 * | 7/2007 | Iida et al. | 56/157 |

FOREIGN PATENT DOCUMENTS

GB    2079393 A    1/1982
JP    403024352 A    2/1991

* cited by examiner

*Primary Examiner*—Bradley T King
*Assistant Examiner*—Thomas Irvin
(74) *Attorney, Agent, or Firm*—Patrick M. Sheldrake; Michael G. Harms

(57) ABSTRACT

A work vehicle includes a frame and an axle assembly coupled to the frame, including a first axle shaft substantially disposed in an axle housing. A first wheel couples to the first axle shaft of the axle assembly. An axle lubricating fluid is disposed within the axle housing. A cooling circuit fluidly coupled to the axle assembly circulates cooling fluid therethrough. A hydraulic motor fluidly coupled to a fluid circuit includes a device disposed in parallel with the fluid circuit to discontinue operation of the motor in response to a predetermined pressure of at least one of the first and second circuit being exceeded.

17 Claims, 3 Drawing Sheets

EXTERNAL AXLE COOLING SYSTEM

FIELD OF THE INVENTION

The present invention relates generally to the field of work vehicles. It relates more particularly to removal of braking heat from an axle of a wheeled loader.

BACKGROUND OF THE INVENTION

Some work vehicles, such as end loaders, must change their directions of movement frequently. To do this, wheel or live axle brakes are generally used to first bring the vehicle to a stop. When this is done frequently, the brakes become overheated.

This has sometimes been resolved by placing the brakes inside an axle housing, where the heat generated by brake friction is removed from the brake by an axle lubricating bath. The lubricant spreads the heat over the entire interior surface of the axle housing, whereupon thermal conduction through the walls of the axle housing heat the exterior surface of the axle housing and provide increased surface area for heat to be convected away by ambient air.

In some instances, however, convection to and from the axle housing surfaces is insufficient to remove braking heat rapidly enough, and the axle lubricant consequently becomes excessively hot (e.g., above 300 degrees Fahrenheit). This is injurious not only to the lubricant itself (accelerating oxidation and breakdown), but also to the bearings and seals associated with the axle shaft.

Typically, the brake is a wet multiple disk brake; "wet", because the disks rotate through a bath of lubricating oil. As the multiple brake disks rotate through the lubricating oil, braking heat is transferred from the disks to the lubricating oil.

The temperature of the lubricating oil consequently increases, and some of the heat within the lubricating oil is transferred to the axle shaft and to the axle housing. The axle shaft and axle housing are of limited size and mass and, hence, of limited heat capacity. Therefore, their temperatures begin to approach (under the duty cycle of frequent stops characteristic of a loader) the temperature of the lubricating oil because ambient air typically does not convect heat from the axle housing as rapidly as the brake convects heat into the lubricating oil. It is therefore necessary to actively cool the lubricating oil.

While one can add a cooling loop to an axle assembly and pump hot lubricating oil through a fan-cooled radiator, this is a costly and cumbersome approach. Further, it increases the number of opportunities for leakage or contamination of the lubricating oil in what is typically a dirty and dusty environment.

It would be advantageous to provide an apparatus and method of removing excessive heat from the axle lubricant, thereby cooling the axle assembly, without substantially increasing the risks of lubricant leakage and/or contamination.

SUMMARY OF THE INVENTION

The present invention relates to a work vehicle including a frame and a first axle assembly coupled to the frame and including a first axle shaft, a second axle shaft and a first axle housing. The first and second axle shaft are disposed substantially within the first axle housing. A first wheel is coupled to the first axle shaft and a second wheel coupled to the second axle shaft of the first axle assembly. A second axle assembly is coupled to the frame and includes a third axle shaft, a fourth axle shaft and a second axle housing. The third and fourth axle shaft are disposed substantially within the second axle housing. A third wheel is coupled to the third axle shaft and a fourth wheel coupled to the fourth axle shaft of the second axle assembly. An axle lubricating fluid is disposed within the first and second axle housing. A first cooling fluid circuit is fluidly coupled to the first axle to circulate axle lubricating fluid therethrough, the first cooling circuit including a first fluid pump. A second cooling fluid circuit is fluidly coupled to the second axle to circulate axle lubricating fluid therethrough, the second cooling circuit including a second fluid pump. A hydraulic motor is fluidly coupled to a third fluid circuit. The motor simultaneously controls both the first and the second fluid pumps, wherein the motor discontinues operation in response to fluid pressure of at least one of the first and second circuit exceeding a predetermined value.

The present invention further relates to a work vehicle including a frame and a first axle assembly coupled to the frame and including a first axle shaft, a second axle shaft and a first axle housing. The first and second axle shaft are disposed substantially within the first axle housing. A first wheel is coupled to the first axle shaft and a second wheel is coupled to the second axle shaft of the first axle assembly. A second axle assembly is coupled to the frame and includes a third axle shaft, a fourth axle shaft and a second axle housing. The third and fourth axle shaft are disposed substantially within the second axle housing. A third wheel is coupled to the third axle shaft and a fourth wheel is coupled to the fourth axle shaft of the second axle assembly. An axle lubricating fluid is disposed within the first and second axle housing. A first cooling fluid circuit is fluidly coupled to the first axle to circulate axle lubricating fluid therethrough, the first cooling circuit including a first fluid pump. A second cooling fluid circuit is fluidly coupled to the second axle to circulate axle lubricating fluid therethrough, the second cooling circuit including a second fluid pump. A hydraulic motor simultaneously controls both the first and the second fluid pumps. The motor is driven by a third fluid circuit including a device disposed in parallel with the third fluid circuit.

An advantage of the present invention is the apparatus reduces excessive heat from the axle lubricant associated with operation of a work machine.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
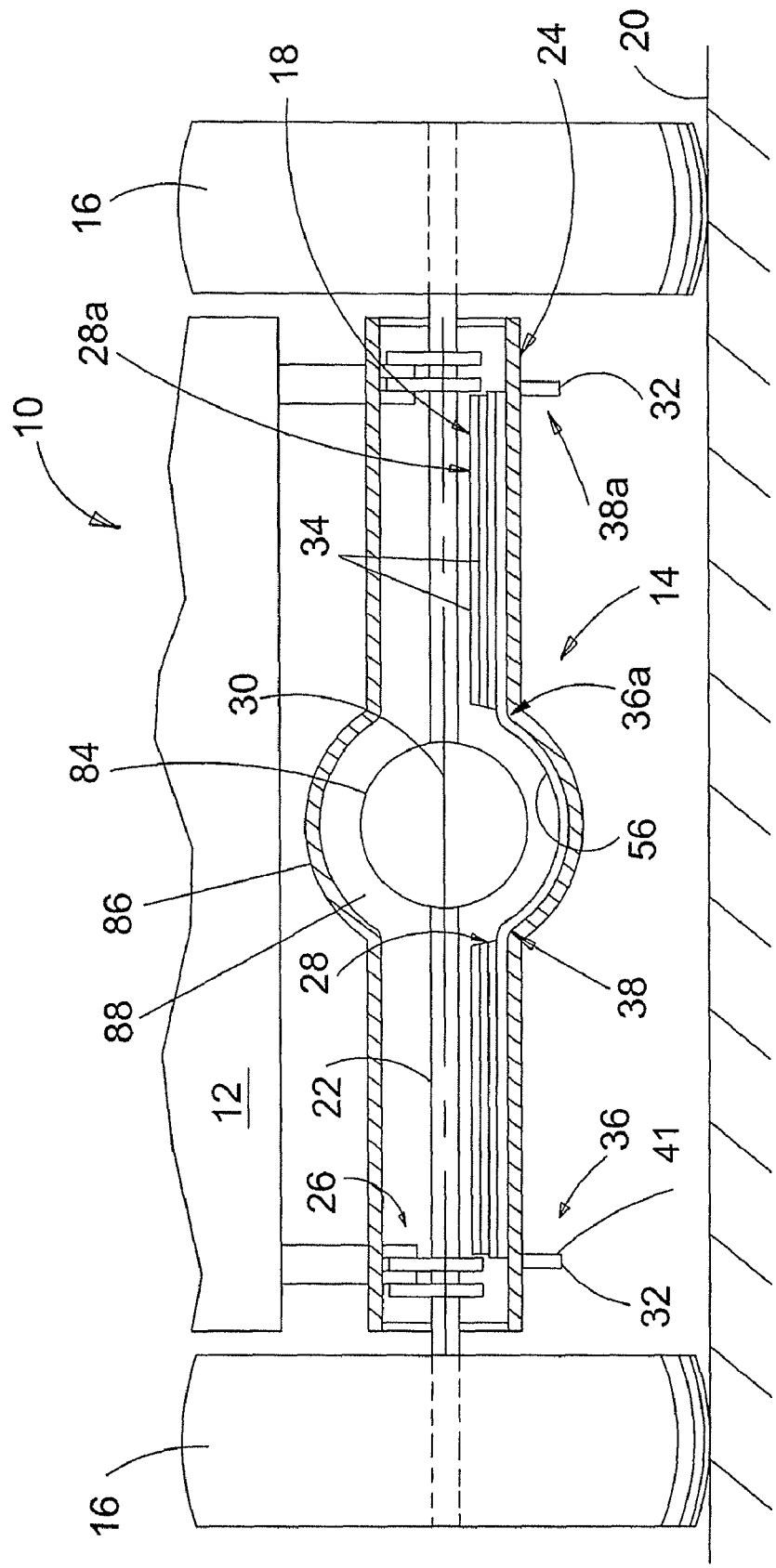
FIG. 1 is a rear sectional elevation view of an axle assembly of a work vehicle.

FIG. 1 shows a work vehicle 10 provided with a frame 12, an axle assembly 14, wheels 16, and an axle cooling apparatus 18. Frame 12 may be of any of the conventional types including fabricated steel or cast iron. Axle assembly 14 and axle cooling apparatus 18 are described below, and wheel 16 may be of any of the conventional types; e.g., rubber-tired, cleated, or tracked. Wheels 16 support axle assembly 14 with respect to a pavement or ground surface 20, and axle assembly 14 supports frame 12. Only one axle assembly 14 is shown, but work vehicle 10 may include any number of axle assemblies 14.

Axle assembly 14 includes at least one axle shaft 22 generally contained within an axle housing 24 and supported by axle housing 24 for rotative movement relative to axle housing 24. Axle shaft 22 is of conventional construction, typically machined of a medium-carbon steel and hardened at least in the regions of splines (not shown). Axle housing 24 is also generally of conventional construction (e.g., cast gray or ductile iron or fabricated of steel), but is of generally large transverse sectional size to accommodate a brake 26 and a cooling device, or coil 28 (both described below), as well as a planetary gearset (not shown). Axle housing 24 may be of any transverse sectional shape; e.g., round, square, etc.

Brake 26, shown schematically in FIG. 1, is, in an exemplary embodiment, a wet multidisk brake of well-known and conventional design. The term "wet" refers to a bath of lubricating fluid 30 that at least partially immerses brake 26, lubricating fluid 30 thereby providing both lubrication and cooling of brake 26.

A cooling device, shown as a coil 28 and a portion of axle cooling apparatus 18 (described below), is also housed within axle housing 24. Coil 28 is a tubular device having a passage 32 provided internally therethrough, is of generally conventional construction and is fabricated of a plurality of metal tubes 34, generally similar to a tube bundle of a shell-and-tube heat exchanger. In an exemplary embodiment, coil 28 is formed of a single length of tubing in one or more parallel "passes" by a series of 180 degree bends, providing a plurality of parallel tube lengths, each length connected to an adjacent length at one end so that the passes are disposed in serial flow arrangement and coil 28 has one inlet port 36 and one outlet port 38. In an alternative embodiment (not shown), a coil is fabricated of a plurality of cut tube lengths joined to each other by "U"-shaped return bend fittings, themselves fabricated, if necessary, of a street elbow secured and sealed to a conventional elbow. In a further alternative embodiment, coil 28 includes fins, dimples, or is flattened to increase the surface area thereof in contact with lubricating fluid 30, and thereby to increase the heat transfer from lubricating fluid 30 to coil 28.

In yet a further embodiment, axle assembly 14 includes a second coil 28a, generally similar to first coil 28 described above. Second coil 28a is fluidly disposed in parallel flow relationship to first coil 28. Inlet port 36 of first coil 28 is in fluid communication with inlet port 36a of second coil 28a, and outlet port 38 of first coil 28 is in fluid communication with outlet port 38a of second coil 28a. This provides a large flow area, and hence a high flow rate of cooling fluid through first coil 28 and second coil 28a, allowing a high heat transfer rate with a relatively small and inexpensive first coil 28 and second coil 28a. In another embodiment, second coil 28a is fluidly disposed in series flow relationship to first coil 28 by use of a connector, shown as a crossover conduit 56. Outlet port 38 of first coil 28 delivers cooling fluid to inlet port 36a of second coil 28. This configuration provides a greater length of time for any given particle of cooling fluid to absorb heat from coils 28 and 28a at a relatively low flow rate, providing a relatively large efficiency of cooling in terms of the quantity of thermal units transferred per unit of cooling fluid volume.

Coils 28, 28a are disposed near an inner bottom surface of axle housing 24 to ensure its immersion in lubricating oil in various pitch and roll angles of work vehicle 10. In an exemplary embodiment, at least the lower portion of axle housing 24 is of a square transverse sectional shape so that coils 28, 28a may be formed of a flat sectional shape. In an alternative embodiment, the transverse sectional shape of an axle housing is generally circular and the sectional shape of a coil is that of a segment of a circle having a slightly smaller radius than that of an inner surface of the axle housing.

Figure 2:
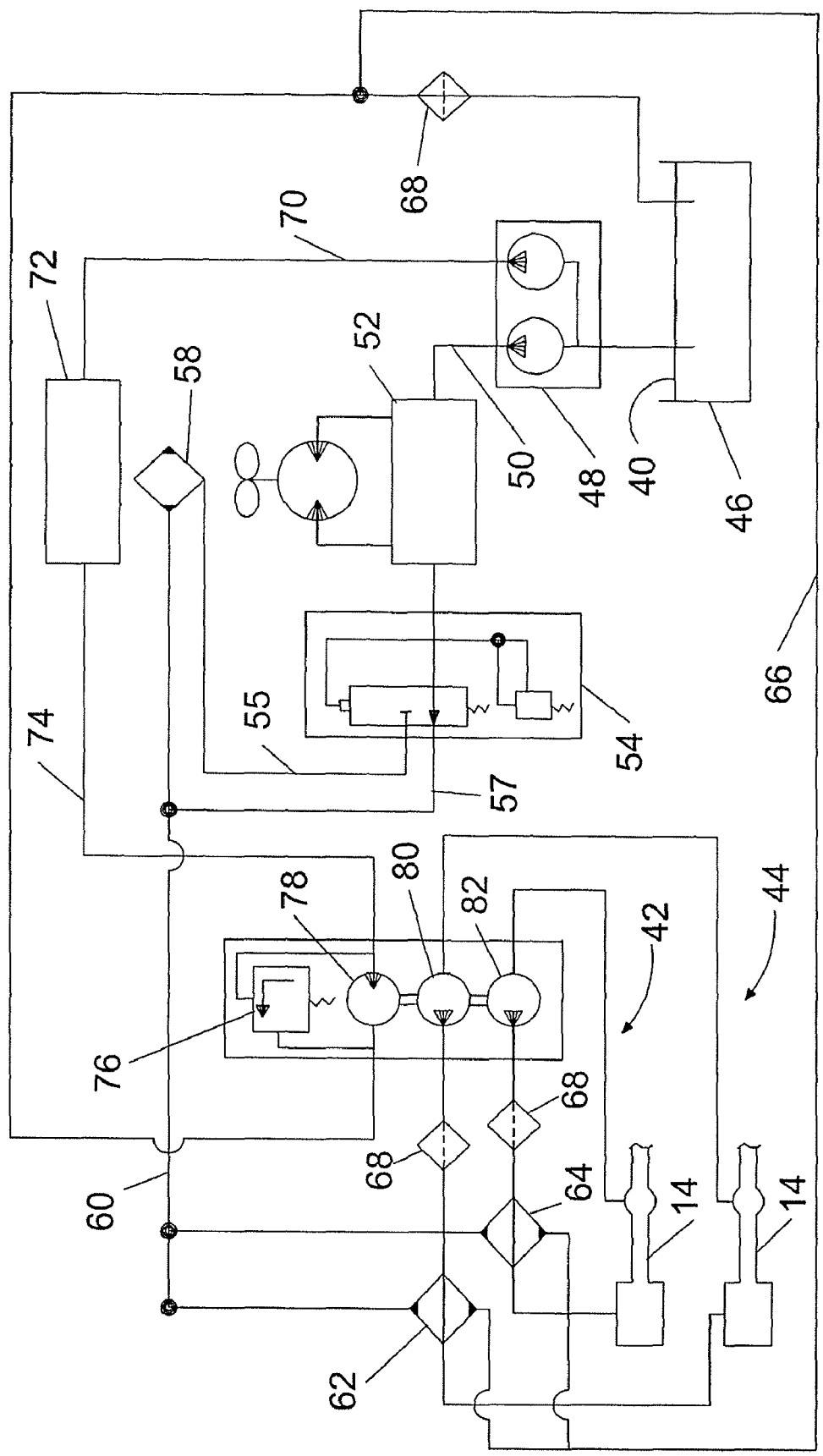
FIG. 2 is a schematic diagram of an embodiment of an axle cooling apparatus for cooling two axle assemblies.

Passage 32 within coils 28, 28a is filled with a cooling fluid 41 (circulating in cooling circuits 42, 44 in FIG. 2). If cooling fluid 41 is of a high pressure (e.g., greater than 80 pounds per square inch), coils 28, 28a are preferably fashioned of a formable steel tube material and secured to fittings by welding or brazing. If cooling fluid 41 is of a lower pressure, coils 28, 28a may advantageously be fashioned of a copper alloy (e.g., a soft brass) or an aluminum alloy for higher thermal conductivity and therefore a higher rate of heat transfer.

Cooling fluid 41 may be any of fluid, liquid or gaseous, with sufficient heat capacity and flow rate to remove braking heat from coils 28, 28a. Since, however, most examples of work vehicle 10, such as a loader, are provided with hydraulic systems which include a hydraulic fluid generally maintained much lower than 300 degrees in temperature and otherwise suitable for removing heat from coils 28, 28a, in an exemplary embodiment work vehicle 10 uses hydraulic fluid obtained from an existing work vehicle hydraulic system as cooling fluid 41.

In operation, lubricating fluid 30 receives heat from brake 26. Fluid 30 flows around coils 28, 28a. Coils 28, 28a have outer and inner surfaces. Fluid 30 has a higher temperature than the outer surface of coils 28, 28a and the outer surface of coils 28, 28a have a higher temperature than cooling fluid 41. This results in heat transfer from lubricating fluid 30 to cooling fluid 41. Heat is removed from cooling fluid 41 as described below with respect to FIG. 2. FIG. 2 is a schematic diagram of axle cooling circuit 42 for an axle cooling apparatus 18 having one coil 28 or coils 28, 28a for cooling of an axle assembly 14. FIG. 2 further shows an axle cooling circuit 44 for a second axle assembly 14. It is to be understood that more than two axle assemblies may be cooled, if desired. Cooling apparatus 18 is a portion of a much larger and more complex hydraulic power circuit. In one embodiment, cooling circuits 42, 44 receive cooling from a fluid circuit associated with driving a fan valve 52, as will be discussed in additional detail below. However, it is to be understood that fluid circuits for other systems or subsystems may also be used. In addition, components, such as filters 68, are shown at optional locations in FIG. 2, but not further discussed.

It is to be understood that while lubricating fluid 30 may be maintained separately from cooling fluid 41, in one embodiment, lubricating fluid 30 and cooling fluid 41 may be the same fluid.

As further shown in FIG. 2, the fluid circuit associated with driving fan valve 52 includes a reservoir 46 for circulating cooling fluid 40 that is drawn therefrom by a pump 48. Pump 48 may include one or more pumps disposed in a desirable arrangement. Pump 48 delivers a cooling fluid 40 through line 50 to fan valve 52. An optional thermal bypass valve 54 downstream of fan valve 52, when actuated, directs cooling fluid 40 through lines 57 and 60, thereby bypassing line 55 and heat exchanger 58. Bypassing heat exchanger 58 prevents undesired cooling of cooling fluid 40, such as during operation in extremely cold conditions. At line 60, flow of cooling fluid 40 may be bifurcated through heat exchangers 62 and 64. In heat exchanger 62, cooling fluid 40 is placed in thermal communication with cooling fluid 41 of cooling circuit 44 to cool lubricating fluid 30 (FIG. 1) in axle assembly 14. Cooling fluid 41 of cooling circuit 44 is circulated by a pump 80.

In heat exchanger 64, cooling fluid 40 is placed in thermal communication with cooling fluid 41 of cooling circuit 42 to cool lubricating fluid 30 (FIG. 1) in axle assembly 14. Cooling fluid 41 of cooling circuit 42 is circulated by a pump 82. Pumps 80, 82 are driven by a motor 78 that is associated with a separate fluid circuit, which is further discussed below. After flowing though heat exchangers 62, 64, cooling fluid 40 is returned through return line 66 to reservoir 46.

FIG. 2 further shows the separate fluid circuit associated with motor 78. A line 70 delivers cooling fluid 40 from pump 48 to brake valve 72 which operates brake 26 (FIG. 1). After flowing through brake valve 72, cooling fluid 40 is directed to flow through line 74 to operate motor 78, which in turn operates pumps 80, 82 to circulate cooling liquid 41 through respective cooling circuits 42, 44. In one embodiment, motor 78 includes a shaft (not shown) that is connected to each of pumps 80, 82. In other embodiments, motor 78 may be connected to pumps 80, 82 by a belt or chain drive, or other arrangement permitting the motor to operate the pumps. In operation, motor 78 rotates the shaft, which rotational shaft movement likewise operates pumps 80, 82. It is to be understood that motor 78 may operate more than two pumps, if desired, and that the pumps may have different operational capacities with respect to each other. A pressure relief valve 76 is arranged in parallel with motor 78. This parallel arrangement limits the power of motor 78, and likewise limits the power available at pumps 80, 82, thereby reducing negative effects of cavitation that may occur when the work vehicle operates in extremely cold conditions. In one embodiment, in response to increased fluid pressure values, such as brought about by extremely cold conditions sufficiently increasing the fluid viscosity of fluid flowing through at least one, or both of cooling circuits 42, 44, as sensed by pressure relief valve 76, motor 78 discontinues operation.

It is appreciated by those having ordinary skill in the art, that a motor resistance and hydraulic pressure relief discussed above may be used to eliminate the need for an electrical control system requiring sensors, such as temperature sensors, and a controller to electrically operate a motor, further requiring an electronic clutch, thereby avoiding such expenses.

In an embodiment of axle assembly 14, first axle shaft 22 and a second axle shaft may be connected to opposite sides of a differential gearset 84 (shown in FIG. 1). Generally, a differential housing 86, configured to include a chamber 88 to accommodate differential gearset 84, is then provided to support and shield differential gearset 84 and to contain a lubricant for differential gearset 84. Typically, this lubricant will be similar to lubricating fluid 30, and one common bath of lubricating fluid 30 may be used for lubrication of differential gearset 84 as well as for lubrication and cooling of other parts of axle assembly 14. Crossover conduit 56 may then be given the bowed shape shown in FIG. 1 in order to not interfere with differential gearset 84.

It is to be understood that while heat exchanger 58 is shown as an air-to-oil type heat exchanger and that heat exchangers 62, 64 are oil-to-oil type heat exchangers, other heat exchanger types may be used, including but not limited to water-to-oil.

Figure 3:
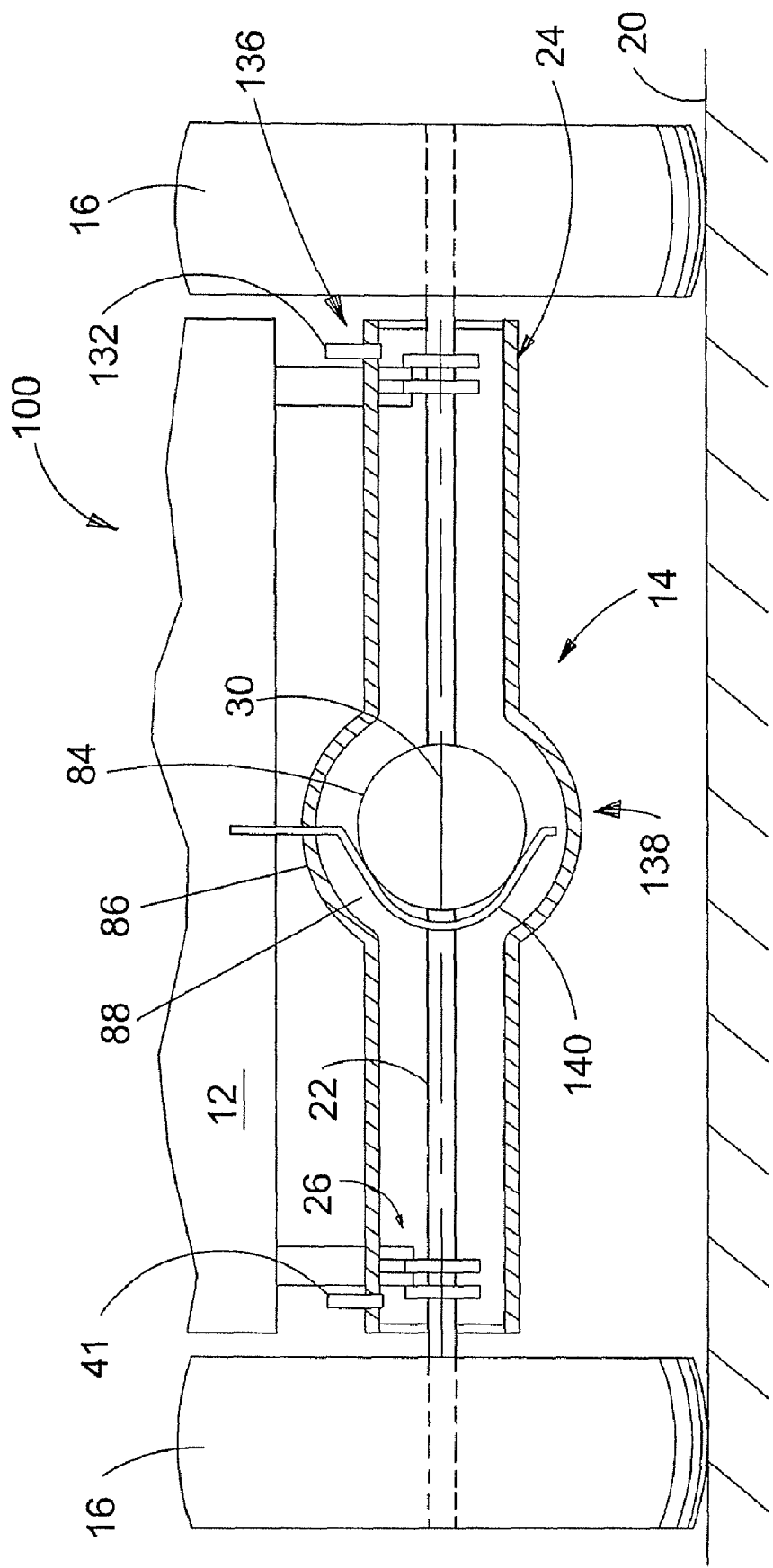
FIG. 3 is a rear sectional elevation view of an axle assembly of a work vehicle according to another embodiment.

In another embodiment of work vehicle 100 shown in FIG. 3, which is otherwise similar to work vehicle 10, there is no coil 28, 28*a* disposed in axle housing 24 to circulate lubricating fluid 30 for purposes of heat transfer from brake 26. Instead, an inlet port 136 is disposed adjacent to brake 26, and in one embodiment, to both brakes 26. A discharge port 138 of a discharge line 140 is disposed adjacent to differential gearset 84. Instead of there being a separated lubricating fluid 30 maintained separately from cooling fluid 41 as in work vehicle 10, the axle cooling fluid 41 and lubricating fluid 30 are the same fluid in axle assembly 14. In one embodiment, cooling fluid 41 enters inlet port 136 and is sprayed onto brake 26. Simultaneously, lubricating fluid 30 exits axle assembly 14 via discharge port 138 of discharge line 140, and upon exiting axle assembly 14 becomes cooling fluid 41.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A work vehicle comprising:
a frame;
a first axle assembly coupled to the frame and including a first axle shaft, a second axle shaft and a first axle housing, wherein the first axle shaft is disposed substantially within the first axle housing;
a first wheel coupled to the first axle shaft and a second wheel coupled to the second axle shaft of the first axle assembly;
a second axle assembly coupled to the frame and including third axle shaft, a fourth axle shaft and a second axle housing, wherein the third and fourth axle shaft are disposed substantially within the second axle housing;
a third wheel coupled to the third axle shaft and a fourth wheel coupled to the fourth axle shaft of the second axle assembly;
an axle lubricating fluid disposed within the first and second axle housing;
a first cooling fluid circuit fluidly coupled to the first axle assembly to circulate axle lubricating fluid therethrough, the first cooling circuit including a first fluid pump;
a second cooling fluid circuit fluidly coupled to the second axle assembly to circulate axle lubricating fluid therethrough, the second cooling circuit including a second fluid pump;
wherein the first and second cooling fluid circuits are independent of each other; and
a hydraulic motor fluidly coupled to a third fluid circuit, the motor simultaneously controlling both the first and the second fluid pumps, wherein the motor discontinues operation in response to fluid pressure of at least one of the first and second circuit exceeding a predetermined value, the predetermined value corresponding to a motor resistance resulting from a predetermined increase in viscosity of fluid, traveling through at least one, or both of the fluid pumps in the first and second cooling circuits.

2. The work vehicle of claim 1, wherein the first and second cooling fluid circuits are closed circuits and the third circuit, separate from the first and second circuits, also delivers cooling fluid to a brake valve for operation of an associated brake.

3. The work vehicle of claim 1, wherein a pump in the third circuit is configured to drive the motor and also a heat exchanger associated with the fluid path of at least one of the first and second cooling fluid circuits.

4. The work vehicle of claim 1, further comprising at least one heat exchanger associated with at least one of the first and second cooling fluid circuit that is oil-to-oil.

5. The work vehicle of claim 1, further comprising at least one heat exchanger associated with at least one of the first and second cooling fluid circuit that is air-to-oil.

6. The work vehicle of claim 1, further comprising a heat exchanger associated with at least one of the first and second cooling fluid circuit that is water-to-oil.

7. The work vehicle of claim 1, wherein the first and second fluid pumps have substantially equal capacity.

8. The work vehicle of claim 1, further comprising at least one heat exchanger associated with at least one of the first and second cooling fluid circuit that is air-to-oil.

9. A work vehicle comprising:
a frame;
a first axle assembly coupled to the frame and including a first axle shaft, a second axle shaft and a first axle housing, wherein the first and second axle shaft are disposed substantially within the first axle housing;
a first wheel coupled to the first axle shaft and a second wheel coupled to the second axle shaft of the first axle assembly;
a second axle assembly coupled to the frame and including a third axle shaft, a fourth axle shaft and a second axle housing, wherein the third and fourth axle shaft are disposed substantially within the second axle housing;
a third wheel coupled to the third axle shaft and a fourth wheel coupled to the fourth axle shaft of the second axle assembly;
an axle lubricating fluid disposed within the first and second axle housing;
a first cooling fluid circuit fluidly coupled to the first axle assembly to circulate axle lubricating fluid therethrough, the first cooling circuit including a first fluid pump;
a second cooling fluid circuit fluidly coupled to the second axle assembly to circulate axle lubricating fluid therethrough, the second cooling circuit including a second fluid pump;
wherein the first and second cooling fluid circuits are independent of each other; and
a hydraulic motor simultaneously controlling both the first and the second fluid pumps wherein the hydraulic motor is driven by a third fluid circuit including a device disposed in parallel with the third fluid circuit, the device configured to reduce the flow through at least one, or both of the fluid pumps in the first and second cooling circuits in response to a property of the hydraulic motor exceeding a predetermined value.

10. The work vehicle of claim 9, wherein the device is a pressure relief valve.

11. The work vehicle of claim 9, further comprising a pump in the third circuit configured to drive the hydraulic motor and also a heat exchanger associated with the fluid path of at least one of the first and second cooling fluid circuits.

12. The work vehicle of claim 9, further comprising at least one heat exchanger associated with at least one of the first and second cooling fluid circuit that is oil-to-oil.

13. The work vehicle of claim 9, further comprising at least one heat exchanger associated with at least one of the first and second cooling fluid circuit that is water-to-oil.

14. The work vehicle of claim 9, wherein the first and second fluid pumps have substantially equal capacity.

15. The work vehicle of claim 9, further comprising a heat exchanger associated with the first and second cooling fluid circuits that further comprises a thermal bypass valve.

16. A work vehicle comprising:
a frame;
a first axle assembly coupled to the frame and including a first axle shaft, a second axle shaft and a first axle housing, wherein the first axle shaft is disposed substantially within the first axle housing;
a first wheel coupled to the first axle shaft and a second wheel coupled to the second axle shaft of the first axle assembly;
a second axle assembly coupled to the frame and including third axle shaft, a fourth axle shaft and a second axle housing, wherein the third and fourth axle shaft are disposed substantially within the second axle housing;
a third wheel coupled to the third axle shaft and a fourth wheel coupled to the fourth axle shaft of the second axle assembly;
an axle lubricating fluid disposed within the first and second axle housings;
a first cooling fluid circuit fluidly coupled to the first axle to circulate axle lubricating fluid therethrough, the first cooling circuit including a first fluid pump;
a second cooling fluid circuit fluidly coupled to the second axle to circulate axle lubricating fluid therethrough, the second cooling circuit including a second fluid pump; and
a hydraulic motor fluidly coupled to a third fluid circuit, the motor simultaneously controlling both the first and the second fluid pumps, wherein the motor discontinues operation in response to fluid pressure of at least one of the first and second circuit exceeding a predetermined value, the predetermined value corresponding to a motor resistance resulting from a predetermined increase in viscosity of fluid, traveling through at least one, or both of the pumps in the first and second cooling circuits, wherein the motor is driven by a fluid circuit including a relief valve disposed in parallel therewith.

17. A work vehicle comprising:
a frame;
a first axle assembly coupled to the frame and including a first axle shaft, a second axle shaft and a first axle housing, wherein the first and second axle shaft are disposed substantially within the first axle housing;
a first wheel coupled to the first axle shaft and a second wheel coupled to the second axle shaft of the first axle assembly;
a second axle assembly coupled to the frame and including a third axle shaft, a fourth axle shaft and a second axle housing, wherein the third and fourth axle shaft are disposed substantially within the second axle housing;
a third wheel coupled to the third axle shaft and a fourth wheel coupled to the fourth axle shaft of the second axle assembly;
an axle lubricating fluid disposed within the first and second axle housing;
a first cooling fluid circuit fluidly coupled to the first axle assembly to circulate axle lubricating fluid therethrough, the first cooling circuit including a first fluid pump;
a second cooling fluid circuit fluidly coupled to the second axle assembly to circulate axle lubricating fluid therethrough, the second cooling circuit including a second fluid pump;
the first and second cooling fluid circuits are closed circuits and the third circuit, separate from the first and second circuits, also delivers cooling fluid to a brake valve for operation of an associated brake; and
a hydraulic motor simultaneously controlling both the first and the second fluid pumps wherein the hydraulic motor is driven by a third fluid circuit including a device disposed in parallel with the third fluid circuit, the device configured to reduce the flow through at least one, or both of the fluid pumps in the first and second cooling circuits in response to a property of the hydraulic motor exceeding a predetermined value.

* * * * *